(12) United States Patent
Khayrallah et al.

(10) Patent No.: US 11,038,648 B1
(45) Date of Patent: Jun. 15, 2021

(54) ANTENNA SUBSET SELECTION SIGNALING

(71) Applicant: Telefonaktiebolaget LM Ericsson (publ), Stockholm (SE)

(72) Inventors: Ali S. Khayrallah, Mountain View, CA (US); Robert Baldemair, Solna (SE); Bo Hagerman, Jersey City, NJ (US); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/923,017

(22) Filed: Jul. 7, 2020

(51) Int. Cl.
*H04L 5/00* (2006.01)
*H04L 27/26* (2006.01)

(52) U.S. Cl.
CPC ........ *H04L 5/0051* (2013.01); *H04L 27/2627* (2013.01)

(58) Field of Classification Search
CPC ...... H04B 7/0413; H04B 7/06; H04B 7/0691; H04B 7/0473; H04B 7/0404; H04B 7/0874; H04B 7/0604; H04B 7/0608; H04B 7/082; H04W 72/042; H04W 88/08; H04L 25/03929; H04L 5/0048; H04L 2025/03426; H04L 5/0051; H04L 27/2627; H04J 13/0062; H04J 13/004; H04J 11/00; H04J 13/18
See application file for complete search history.

(56) References Cited

U.S. PATENT DOCUMENTS 7,505,788 B1 * 3/2009 Narasimhan ......... H04B 7/0447
370/329

FOREIGN PATENT DOCUMENTS

WO 2017172983 A1 10/2017
WO 2017172985 A1 10/2017

OTHER PUBLICATIONS

Aydin, et al., "Code-Index Modulation Aided Quadrature Spatial Modulation for High-Rate MIMO Systems," IEEE Transactions on Vehicular Technology, vol. 68, No. 10, Oct. 2019, pp. 10257-10261.

(Continued)

*Primary Examiner* — Rahel Guarino
(74) *Attorney, Agent, or Firm* — NDWE, LLP

(57) ABSTRACT

A method of a base station to transmit information on an ancillary channel includes encoding a set of bits from input information as a codeword, selecting a subset of active antennas that map to the codeword, and transmitting at least one main channel payload on each antenna of the selected subset of active antennas with one of a plurality of different dedicated pilot signals associated with each respective one of the antennas of the selected subset of active antennas.

20 Claims, 9 Drawing Sheets

(56) References Cited

OTHER PUBLICATIONS

Bachoc, et al., "On Bounded Weight Codes," IEEE Transactions on Information Theory, vol. 57, No. 10, Oct. 2011, pp. pp. 1-13.
Brouwer, "A New Table of Constant Weight Codes," IEEE Transactions on Information Theory, vol. 36, No. 6, Nov. 1990, pp. 1334-1380.
Mesleh, et al., "Spatial Modulation," IEEE Transactions on Vehicular Technology, vol. 57, No. 4, Jul. 2008, pp. 2228-2241.
Mokh, et al., "Space Shift Keying Modulations for Low Complexity Internet-of-Things Devices," IEEE GLOBCOM, Dec. 2017, pp. 1-7.
Patcharamaneepakorn, et al., "Spectral, Energy, and Economic Efficiency of 5G Multicell Massive MIMO Systems With Generalized Spatial Modulation," IEEE Transactions on Vehicular Technology, vol. 65, No. 12, Dec. 2016, pp. 9715-9731.
Younis, et al., "Generalised Spatial Modulation," Proceedings of IEEE ASILOMAR Conference, Asilomar Grounds, Dec. 2010, pp. 1498-1502.

* cited by examiner

ANTENNA SUBSET SELECTION SIGNALING

TECHNICAL FIELD

Embodiments of the invention relate to the field of telecommunications; and more specifically, to the field of wireless communication using radio signals.

BACKGROUND ART

Cellular or mobile communication networks (herein after referred to as 'mobile networks') are widely utilized communication networks that enable communication by user equipment (UE) via a wireless link with the remainder of the mobile network and other devices accessible via the mobile network and other connected networks. Mobile networks are distributed over large geographical areas. The components of the mobile networks that interface with UE via the wireless communication are referred to as "cells," each cell including at least one transceiver, but more normally, a set of transceivers referred to as a base transceiver station or base station. Typically, base stations are at a fixed location, e.g. with their antennas mounted on a tower or a building. Other cases include mobile base stations, e.g. in vehicles, trains, high altitude platforms (HAPS), or satellites. The base stations provide access to UEs within the cell to the mobile network, which can be used for transmission of voice, data, and other types of content. Mobile network operators (MNOs) develop and maintain the mobile networks and contract with subscribers to provide service to their respective UEs.

The wireless communication between base stations and UEs utilizes a form of radio signal communication. One form of radio signal communication utilized by mobile networks is multiple-input and multiple-output (MIMO) communication. MIMO is a method to increase the capacity of radio communication by sending and receiving more than one data signal simultaneously of the same radio channel. In some implementations, MIMO is achieved by using multiple transmission antennas as well as multiple receiving antennas to communicate over each in parallel. MIMO is a standard form of wireless communication utilized in WIFI and cellular communication. Due to the increased demand for mobile communication services, MIMO and related technologies are in constant need of enhancement and improvement to increase the quality of service that can be offered through mobile networks.

SUMMARY

In one embodiment, a method of a base station, where the base station transmits information on an ancillary channel includes encoding a set of bits from input information as a codeword, selecting a subset of active antennas that map to the codeword, and transmitting at least one main channel payload on each antenna of the selected subset of active antennas with one of a plurality of different dedicated pilot signals associated with each respective one of the antennas of the selected subset of active antennas.

In another embodiment, a method of user equipment, where the user equipment receives information on an ancillary channel. The method includes receiving a transmission of information on a main channel and an ancillary channel, where the ancillary channel is encoded in a selection of a subset of active antennas at a transmitter, determining the selection of the subset of active antenna from dedicated pilot signals of the transmission, and extracting a set of information bits from the determined selection of the subset of active antennas.

In a further embodiment, a base station transmits information on an ancillary channel. The base station includes an encoder to map an input ancillary channel payload codeword to a subset of active antennas, and antenna subset selection circuitry coupled to the encoder, the antennas subset selection circuitry to signal a radio front end a selection of the subset of active antennas to transmit a main payload with each active antenna of the subset of active antennas having a different unique pilot.

In one embodiment, user equipment receives information on an ancillary channel. The user equipment includes a plurality of correlator circuits to receive a transmission of information on a main channel and an ancillary channel, where the ancillary channel information is encoded in a selection of a subset of active antennas at a transmitter, each of the plurality of correlator circuits to identify a unique pilot from the subset of active antennas, and an ancillary channel decoder coupled to the plurality of correlator circuits, the ancillary channel decoder to determine a selection of the subset of active antenna from unique pilots of the transmission, and to extract a set of information bits from the determined selection of the subset of active antennas.

BRIEF DESCRIPTION OF THE DRAWINGS

The invention may best be understood by referring to the following description and accompanying drawings that are used to illustrate particular embodiments of the invention. In the drawings.

DETAILED DESCRIPTION

Figure 1:
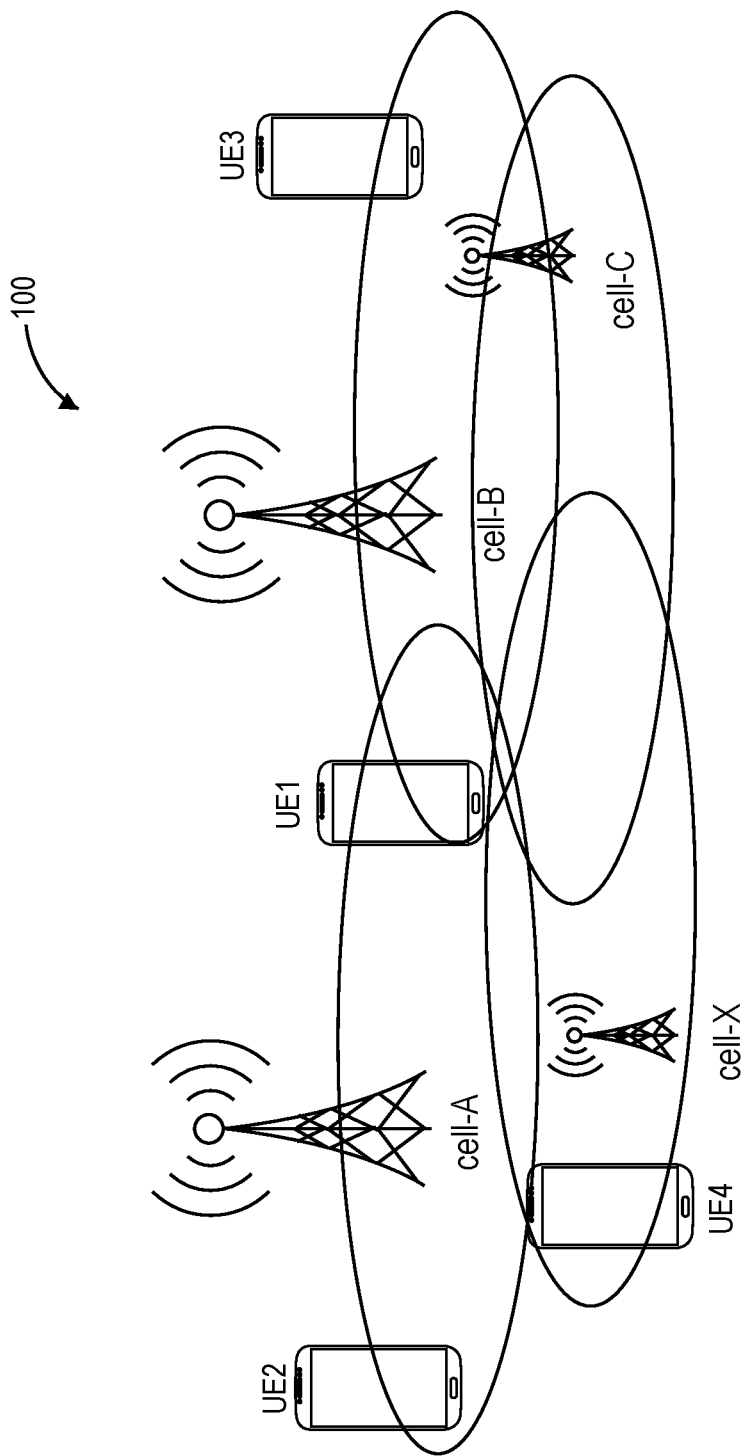
FIG. 1 is a diagram of an example of a mobile network.

The following description describes methods and apparatus for providing an ancillary communication channel using spatial modulation. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

"Circuitry," as used herein, can comprise a combination of one or more of transistor level components (e.g., gates, resistors, transistors, capacitors, inductors, diodes, and similar component connected by conductive wires or traces through which electric current flows), as well as more complex structures, including microprocessor, controller, microcontroller, central processing unit, digital signal processor, application-specific integrated circuit, field programmable gate array, or any other suitable device, resource, or combination of hardware, software, and/or encoded logic operable to provide, either alone or in conjunction with other components, such as device readable medium functionality as described herein. Terms used in combination with "circuitry" herein indicate this "circuitry" structure, e.g., receiver circuitry indicates the "circuitry" structure to perform a receiving function as may be further described herein.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a diagram of an example of a mobile network. The example mobile network 100 illustrates a set of user equipment (UE) devices UE1-3 communicating with base stations of a set of cells cell-A, cell-B, cell-C, and cell-X. A 'set,' as used herein, refers to any positive whole number of items including one item. A mobile network 100 can have any number of cells, base stations, and similar infrastructure that enable wireless communication with any number of UEs. The illustration includes the radio access network (RAN) portion of a mobile network that provides the wireless communication capabilities between the UE and the base stations and cells. The base stations in turn are part of a primarily wired network that provide connectivity between base stations and other devices within and external to the mobile network 100. The illustrated mobile network 100 provides a basic example environment where the embodiments could be utilized to improve the radio communications between UE and the base stations. Each base station and cell can include any number of transceiver antennas. Similarly, each UE can have any number of transceiver antennas. As used herein, "antenna" or "antennas" are considered to be equivalent to antenna-elements, groups of antenna-elements, or radiation elements having the finest granularity unit addressable from baseband processing generating transmitted signal(s) or the equivalents as would be understood by those skilled in the art. The examples herein primarily utilize an example of the base stations having a larger array of available antennas and being the transmitter of information to the UEs, whereas the UEs have a more limited number of antennas and are receivers of information via wireless communication. However, one skilled in the art would understand that the embodiments encompass scenarios where the UEs are transmitters and have an equal or greater number of antennas for transmission. Similarly, one skilled in the art would understand that the processes, principles, and structures described herein can be used in other analogous scenarios other than mobile networks.

The embodiments utilize spatial modulation (SM) to provide an ancillary communication channel. SM is a form of multiple-input multiple-output (MIMO). SM is able to convey information via the selection of an active antenna among an available set of N transmit antennas, where N represents any positive whole number. As a result, in addition to the regular information carried in the transmitted signal, there is log 2(N) bits worth of information in the antenna selection, if the receiver can identify the transmit antenna. The embodiments utilize SM to create an ancillary channel operating in parallel with the regular (i.e., main) channel.

However, there are limitations to the utilization of SM for communication. A single antenna selection SM scheme is restrictive, in the sense that it limits the payload of the ancillary channel to log 2(N) bits. The payload of the ancillary channel can be increased by transmitting from more antennas simultaneously. The embodiments use the selection of a subset of available transmitting antennas as a signaling mechanism, and enable more information to be conveyed on the ancillary channel in addition to the regular main information handled by the transmission. The embodiments provide a process and system where each active antenna transmits a unique pilot signal, and where the receiver first detects the pilots non-coherently, then feeds the outcomes into a decoder which identifies the subset of active antennas. With the identification of the subset of active antennas determined, then the receiver extracts the information of the ancillary channel. A channel estimation process used in the regular main payload reception is also produced as a byproduct. The amount of information to be conveyed on the ancillary channel may be adapted according to the channel quality. The ancillary channel information can be encoded or unencoded. In some embodiments, when the ancillary channel information is encoded, the code rate of the ancillary channel encoder can be changed according to the ancillary channel quality. Thus, the embodiments provide a process and system that increases the size of the payload of the ancillary channel without disturbing the regular transmissions.

The embodiments encompass a multiple-input single-output (MISO) system, with one transmitted data stream and N transmit antennas, where N can be any positive whole number. In this example embodiment, the receiver has a single receive antenna. However, one skilled in the art would understand that the principles, processes, and structures described herein are also applicable to receivers with any number of antennas. Other MIMO examples are discussed herein, the MISO example is provided by way of example for sake of clarity in conciseness and not by way of limitation. The embodiments provide a process and system that conveys information via the choice of a subset of A≤N active antennas, where A is any positive whole number. The term 'subset' as used herein, similarly refers to any positive whole number of items that is less than or equal to the entirety of the set. There are $$B = \frac{N!}{A!(N-A)!}$$

different subsets of A antennas. This makes it possible to transmit log 2(B) bits with each selection of antennas or in a given time period. In practice the number of bits can be an integer K=⌊ log 2(B)⌋, where the brackets ⌊ ⌋ indicate the integer part. In some embodiments, it is possible to block (i.e., group) transmissions together to try to increase the number of information bits, depending on the value of B. That is, for 2 transmissions, the number of bits can be expressed as ⌊ log 2(B²)⌋=⌊2 log 2(B)⌋≥2 ⌊ log 2(B)⌋ If ⌊2 log 2(B)⌋=2 ⌊ log 2(B)⌋+1, thus, an extra bit can be obtained. For example, where the total number of available antennas is four and the number of antennas selected for transmitting main information is 2, i.e., N=4 and A=2, in this case B=6 so log 2(B)=2.6 and K=2, whereas 2 log 2(B)=5.2 and K=5.

In some embodiments, each antenna in a selected subset of available antennas can be identified by their indices J={j_1, . . . j_A}. In one example, $2^K$ subsets out of the total B possible choices can be utilized and treated codewords of length N. Each codeword c=[$c_1$, . . . , $c_N$] has A 1's at the indices J indicating the active antennas, and 0's elsewhere. In other embodiments, this encoding can be inverted. In this example embodiment, there is a (N, K) code C with constant weight A. In other embodiments, no constant weight is utilized. This set of codewords can be used to encode information. An encoder maps an ancillary payload of K bit information words to codewords in C (equivalently an active subset J). The encoding is one to one relationship between the information and the codewords.

The embodiments also utilize unique pilot signals for each available antenna. As a baseline or reference point, if all N antennas were active, it would be possible to transmit the same signal from all antennas, possibly after applying a different beamforming coefficient at each antenna. Let $h_1$, . . . , $h_N$ denote the N channel values, where the beamforming coefficients have been absorbed in the channel values. In the baseline or reference system, one common pilot signal would be needed for the purpose of channel estimation. A 'pilot' or pilot signal as used herein refers to a dedicated signal embedded in the transmitted signal at known locations and with known values to the receiver. A pilot signal facilitates detection at the receiver and is characterized by good autocorrelation properties for identification and channel impulse response estimation. In addition, if the pilot signal is one of a set of multiple choices, then the set of pilot signals can be selected such that their cross-correlation is zero, and the set of pilot signals form an orthogonal set of sequences or appear as pseudo random noise. At the receiver, the N signals add up, and the receiver estimates the composite channel $h^c = h_1 + \ldots + h_N$ to enable coherent reception. The receiver does not need to figure out which signal came from which antenna, in this baseline or reference case, or the individual channels.

However, in the embodiments, the transmitter can choose a new subset of A active antennas for each burst, i.e., a set of codewords that are consecutively transmitted within a timeframe (e.g., a slot, sub-frame, transmission duration, or similar timeframe) that can be part of a defined protocol. In order to convey the additional information, the receiver determines which codeword c (equivalently with active subset J) was chosen to transmit the main channel. The embodiments include a method to enable the detection of the active antennas by use of a dedicated pilot for each of the N candidate antennas. Without loss of generality, the dedicated pilot is transmitted at the beginning of the burst by the corresponding antenna. The transmission is otherwise unchanged. The embodiments do not utilize both an antenna specific pilot (i.e., a dedicated pilot) and a common pilot simultaneously. A 'dedicated' pilot, as used herein, is a reference signal specific to an assigned antenna where the signal is not utilized by the other active antennas.

Figure 2:
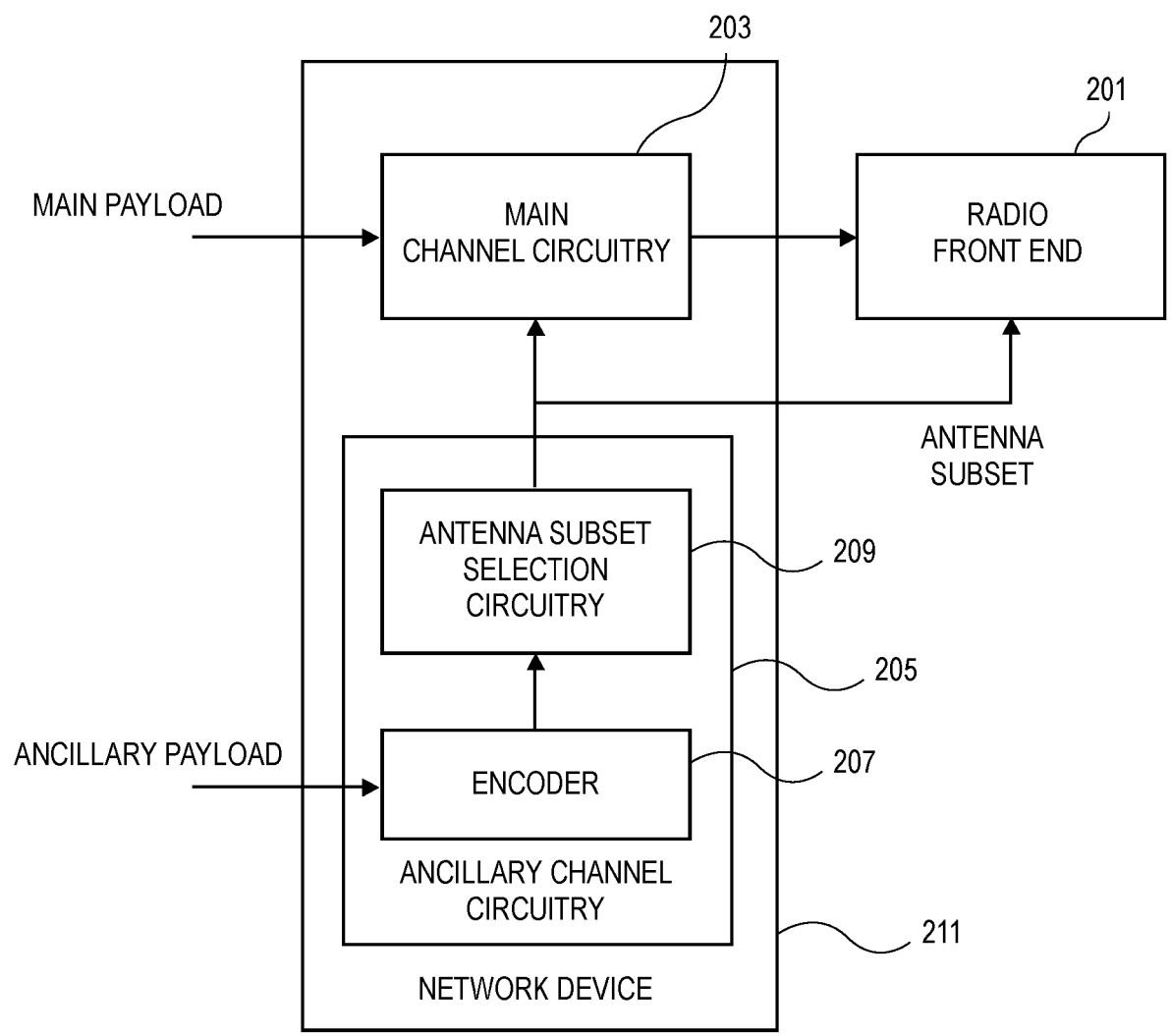
FIG. 2 is a diagram of one embodiment of a transmitter of a network device that is configured to transmit an ancillary channel.

FIG. 2 is a diagram of one embodiment of a transmitter of a network device that is configured to transmit an ancillary channel. In the example illustrated embodiment, the components of the transmitter are illustrated as being implemented within an example network device 211, however, in other embodiments, the components can be distributed over any combination of network devices or other electronic devices.

The network device 211 includes a main channel circuitry 203, and ancillary channel circuitry 205, amongst other components that have been omitted for sake of clarity. The main channel circuitry 203 receives a regular (i.e., main) payload that can be any number of bits of information to be encoded and transmitted by a set of antennas that are part of a radio front end 201. The network device 211 can further include ancillary channel circuitry 205 that receives an ancillary payload as input. The ancillary channel circuitry 205 can include further circuitry such as an encoder 207 and antenna subset selection circuitry 209 to determine the antenna subset selection to drive to the radio front end 201.

In the main channel circuitry 203, the corresponding dedicated pilots for each antenna are added to the regular payload to form dedicated pilot signals. In the radio front end 201, the dedicated pilot signal is routed to its corresponding active antenna. In the ancillary channel circuitry 205, input ancillary payload information can be encoded as a set of codewords by the encoder 207. The antenna subset selection circuitry 209 can drive antenna selection at the radio front end that correlates with the code words determined by the encoder 207.

Figure 3:
FIG. 3 is a diagram of one embodiment of a transmission format.

FIG. 3 is a diagram of one embodiment of a transmission format. In the embodiments, the regular (i.e., main) payload can be preceded by a dedicated pilot signal that is assigned to the associated antenna. The transmission from the antenna will include a dedicated signal with the dedicated pilot for active antenna $j_k$ and the regular main payload is illustrated.

Figure 4:
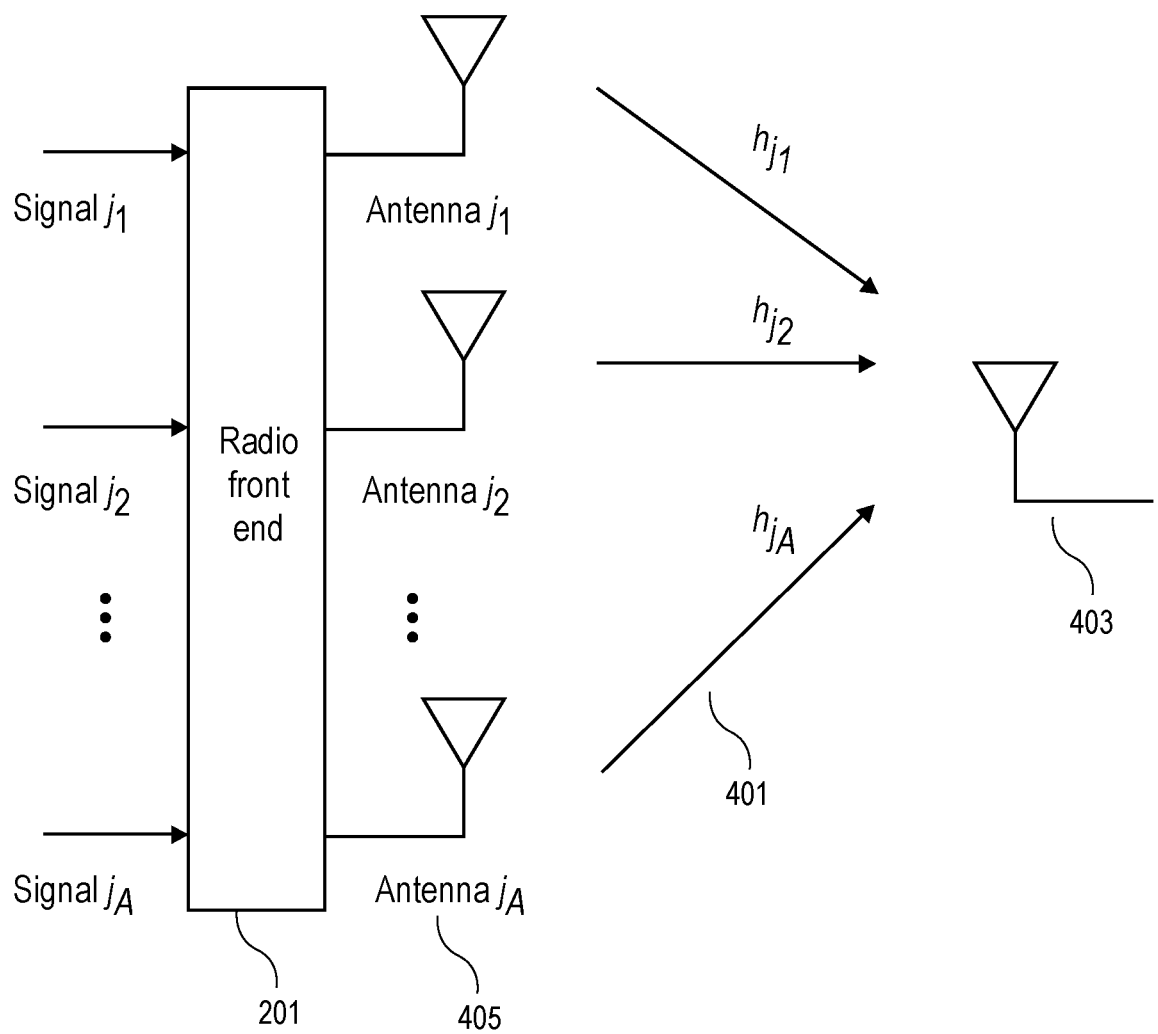
FIG. 4 is a diagram of one embodiment of a radio front end.

FIG. 4 is a diagram of one embodiment of a radio front end. The radio front end 201 can be a set of antennas 405 and associated equipment for sending and receiving radio frequency signals 401. In the illustrated example, the transmitter sends a set of signals $j_1$-$j_A$ to the radio front end 201 to be transmitted via a subset of the N available antennas (i.e., via respective antennas $j_1$-$j_A$ 405). Each of the signals $j_1$-$j_A$ can have a format as described above in relation to FIG. 3. In some embodiment, the signals $j_1$-$j_A$ are further modified, for example by beam forming coefficients to be transmitted as channels $h_1$-$h_{j_A}$. These channels are transmitted simultaneously and received by a set of antennas 403 at a receiving device (e.g., a UE).

Figure 5:
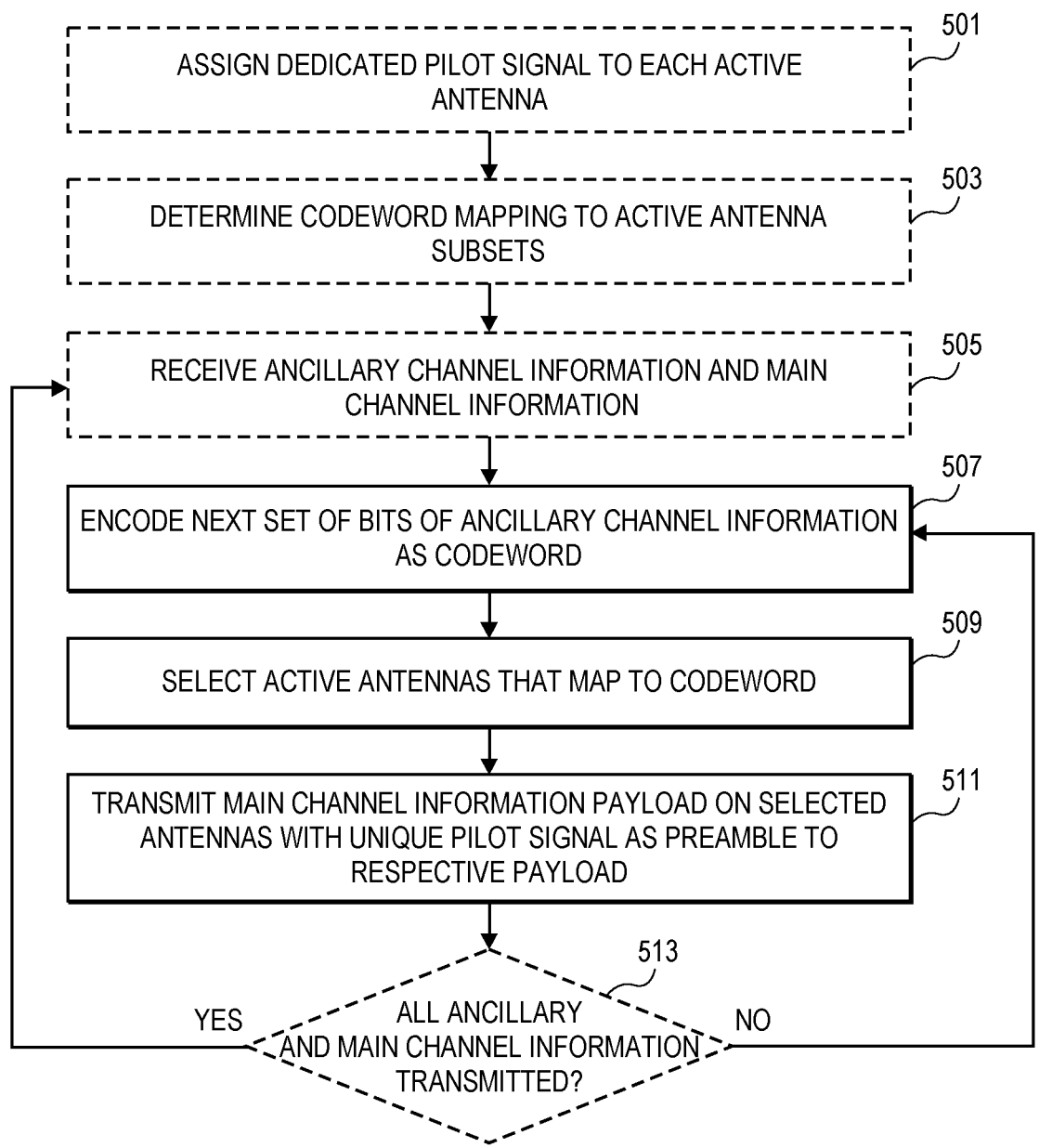
FIG. 5 is a flowchart of one embodiment of the operation of the transmission process.

FIG. 5 is a flowchart of one embodiment of the operation of the transmission process. The process can be implemented by the ancillary channel circuitry or similar components of the transmitter. The process can include preliminary configuration such as assigning a dedicated pilot signal to each active antenna. The relationship of dedicated pilot signals to active antennas is a one to one relationship such that the dedicated pilot signals differ from one another enabling a differentiation between the active antennas. (Block 501). The active antennas will transmit the dedicated pilot signal with each main payload transmission thereby enabling a receiver to identify which antenna has transmitted each main channel signal. Depending on a number of active antennas a set of codewords is determined that can be encoded by the selection of a subset of the active antennas as described herein (Block 503). Each codeword in the set of codewords is correlated with a different active antennas subset. In some embodiments, the correlation is based on active antennas being indexed and each selected antenna in a given subset being a logical one and each unselected antenna being a logical zero. However, any mapping of subset combinations to codewords can be utilized. The codeword to selected antenna subset mapping can be fixed or dynamically changed in response to events such as the addition or loss of active antennas at a radio front end.

Information is input to the transmitter to be encoded for the ancillary channel (Block 505). Information is also input to be transmitted in the main channel. This input can be separately processed by the main channel circuitry and the ancillary channel circuitry. The input ancillary channel information is encoded as a codeword by selecting a next set of bits to be transmitted based on codeword size (Block 507). The encoding step can be a simple mapping process that maps ancillary channel information bits to codewords. The encoding step can also include a channel encoding step where ancillary channel information bits are channel encoded (error protected) and the channel encoded bits are used for antenna selection. Examples of channel codes are Reed Muller codes, BCH codes, polar codes.

The codeword that has been generated then is used to determine the subset of active antennas to select for transmission of the main channel information (Block 509). This can be determined by the pre-determined mapping of the codewords to active antennas subsets. Once the subset of active antennas is selected then the main channel information can be transmitted over the selected subset of active antennas (Block 511). The respective dedicated pilot signal is sent with the main channel information as a preamble to the payload. In other embodiments, the pilot is sent before, after, in-between or in the same symbol as the payload. This process can continue as long as there is ancillary channel information to encode and transmit (Block 513). In cases where there is no ancillary channel information or only ancillary channel information (i.e., no main information), then the process can transmit one without the other in some embodiments. In other embodiments, the ancillary information is only transmitted when there is main channel information to be transmitted.

Figure 6:
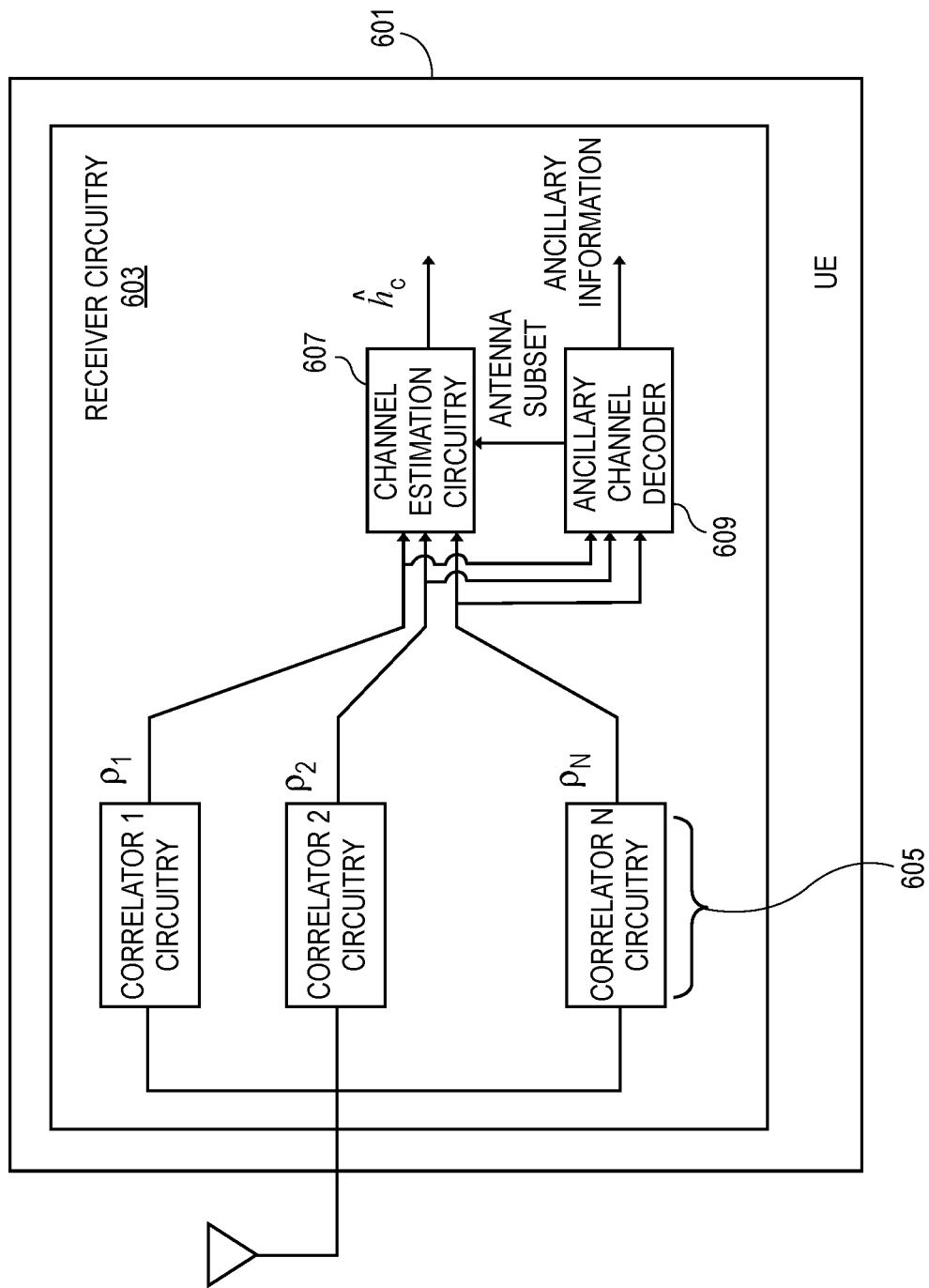
FIG. 6 is a diagram of one embodiment of receiver circuitry for decoding ancillary channel information.

FIG. 6 is a diagram of one embodiment of receiver circuitry for decoding ancillary channel information. The dedicated signals $j_1, \ldots, j_A$ from the main channel are transmitted from their corresponding antennas over corresponding channels to the receive antenna, as described herein above. At the receiver, for example a UE 601, in some embodiments, it is assumed that the ancillary channel is independent from burst to burst, such that the receiver cannot rely on any previous knowledge of the ancillary channel state. The receiver needs to detect the dedicated pilots non-coherently, i.e. without prior information about what the relationship between dedicated pilot signals and antennas are at the transmitter. The dedicated pilots are sequences of length M. Pilot i is denoted $p_i=[p_{i1}, \ldots p_{iM}]$. Without much loss of generality, it can be assumed that all the dedicated pilot signals have the same norm $|p_i|$. A set of correlators 605 in the receiver circuitry 603 can compute the correlation between the corresponding section of the received signal $[r_1, \ldots, r_M]$ and each of the N dedicated pilot signal candidates as $\rho_i = r_1 p_{i1}^* + \ldots + r_M p_{iM}^*$. The receiver circuitry 603 can form the vector $\rho=[|\rho_1|, \ldots, |\rho_N|]$, from the output of the set of correlators 605, which is fed to the ancillary channel decoder 609.

The A dedicated pilot signals are transmitted simultaneously. To facilitate their detection, in some embodiments, the dedicated pilot signals can be designed or selected such that they form an orthogonal set of sequences. Then there is no leakage between the dedicated pilot signals in the correlation computation, which improves performance. Sequence families like Hadamard sequences, Fourier sequences, Zadoff-Chu sequences, or a set of cyclic-shifted Zadoff-Chu sequences, and similar sequences work well in this context. These sequence families also have the advantage of constant modulus symbols, and a fast transform to compute all the correlations together. Some of these sequences are sparse, in the sense that there are only M sequences of length M, so here M=N. Other sequence families would work as well, and can provide a tradeoff of some orthogonality in return for a larger sequence family, meaning that M<N.

In order to identify the active antenna subset, the ancillary channel decoder 609 searches for the received codeword c in C with the shortest L2 distance d to $\rho$, where $d^2=\|c-\rho\|^2 = (c_1-|\rho_1|)^2 + \ldots + (c_N-|\rho_N|)^2$. In the absence of any specific structure to C, the ancillary channel decoder may have to try all $2^K$ candidates. $d^2$ can be rewritten as $d^2=\|c\|^2+\|\rho\|^2 - 2(c_1|\rho_1|+ \ldots +c_N|\rho_N|)$. If $\|c\|$ and $\|\rho\|$ are constant, then computing $d^2$ is equivalent to computing the simpler expression $e=c_1|\rho_1|+ \ldots +c_N|\rho_N|$. The codeword that maximizes e minimizes d. Furthermore, e can be further simplified to the summation over the entries of $\rho$ over the A indices J of 1's in c: $e=|\rho_{j_1}|+ \ldots +|\rho_{j_A}|$. Once the best codeword is found, the inverse map of the encoder identifies the corresponding K information bits of the ancillary payload. This ancillary channel information can then be output by the ancillary channel decoder 609 and the receiver circuitry 603. The decoding of the ancillary channel information can be done in parallel with the processing of the received main channel information.

The receiver circuitry also includes channel estimation circuitry 607. The channel estimate for transmit channel i is given by $$\hat{h}_i = \frac{\rho_i}{\|p_i\|}.$$

A common pilot and an antenna specific pilot are not both needed to estimate the composite main channel. Once the indices j of the active antennas is identified, then the estimate of the composite channel is given by $\hat{h}^c=\hat{h}_{j_1}+ \ldots +\hat{h}_{j_A}$. If the composite channel is to be estimated before or without identifying the active antennas, then the estimate of the composite channel is given by $\hat{h}^c=\hat{h}_1+ \ldots +\hat{h}_N$. Once $\hat{h}^c$ is obtained, it is possible to use it to receive the rest of the burst coherently and output the regular main payload by the channel estimation circuitry 607.

In the example of FIG. 6 the receiver circuitry includes N correlators 605 for each of the dedicated pilot signals, the ancillary channel decoder 609 to determine the active antenna subset and output the ancillary information, and channel estimation circuitry 607 for the reception of the regular main payload.

Figure 7:
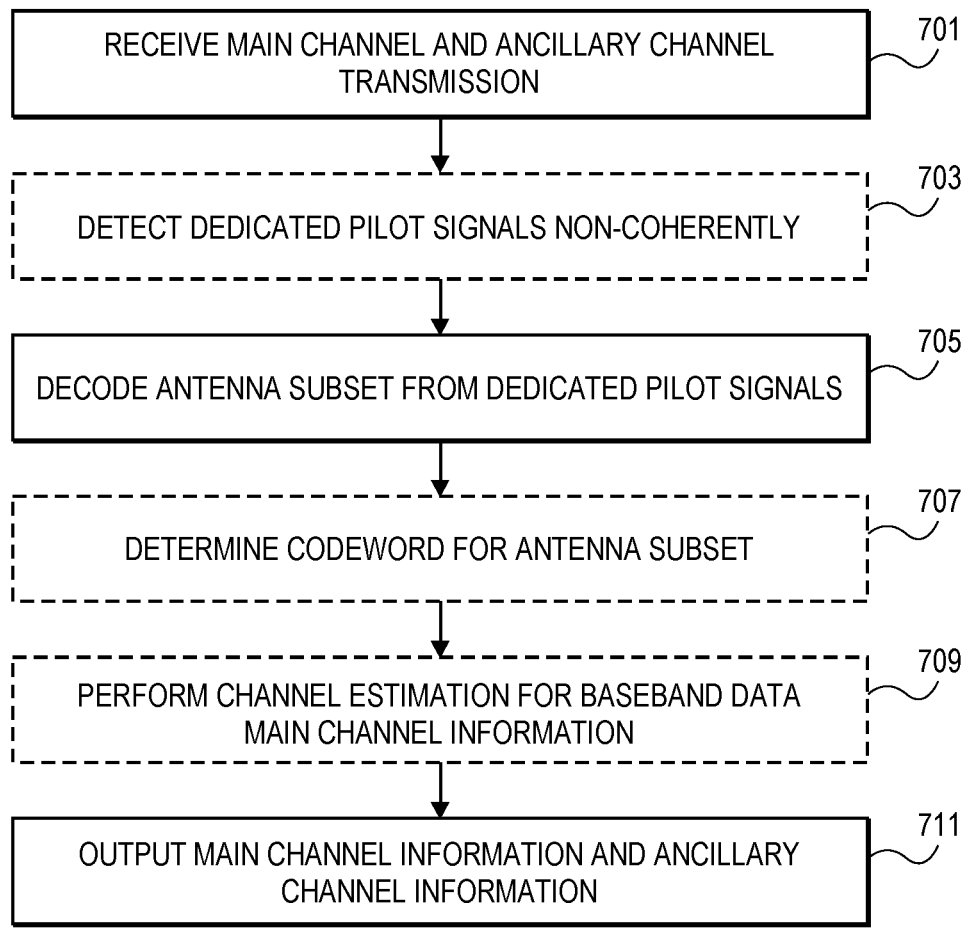
FIG. 7 is a flowchart of one embodiment of the process of the receiver circuitry.

FIG. 7 is a flowchart of one embodiment of the process of the receiver circuitry. The process is initiated in response to receiving a transmission of main channel information as well as ancillary channel information (Block 701). The received signals a processed to detect the dedicated pilot signals non-coherently, where the dedicated pilot signals are correlated and a vector of the received dedicated pilot signals is created (Block 703). Using the vector of the dedicated pilot signals, a subset of active antennas is determined (Block 705). The subset of active antennas is then mapped to a codeword representing the received ancillary channel information (Block 707). Simultaneously, channel estimation can be performed to identify the main channel payload (Block 709). The main channel payload and the ancillary channel information can then be output by the receiver circuitry (Block 711). This process continues as long as addition signals are received from the transmitter.

Examples

A first set of example illustrates the process for N=4, 8 and 16 total transmit antennas. For each of these cases, the number of active antennas A is varied between 1 and N−1. The number of combinations is symmetric in the value of A.

In a 4 antenna example, N=4, and the cases of A=1, 2, 3 are examined. For A=1, K=log 2(B)=2, and the codebook is given by {0001, 0010, 0100, 1000}. By symmetry, for A=3 the codebook is given by {1110, 1101, 1011, 0111}. For A=3, B=6, log 2(B)=2.6, and K=2, the weight 2 sequences are {0011,0110,1100,0101,1010,1001}. Any subset of 4 sequences is a valid codebook. Overall, K=2 for all A, so there is no difference in ancillary payload. The values of log 2(B) and K are shown in Table I below.

N=4 antennas. Values of log 2(B) and ancillary payload length K for A=1, 2, 3.

TABLE I

| A | 1 | 2 | 3 |
|---|---|---|---|
| log2(B) | 2 | 2.58 | 2 |
| K | 2 | 2 | 2 |

In an 8 antenna example, for N=8, the values of log 2(B) and K for A=1, . . . , 7 are shown in Table II. There is a payload advantage to larger A as K increases from 3 for A=1 to a peak of 6 for A=4.

N=8 antennas. Values of log 2(B) and ancillary payload length K for A=1, . . . , 7.

TABLE II

| A | 1 | 2 | 3 | 4 | 5 | 6 | 7 |
|---|---|---|---|---|---|---|---|
| log2(B) | 3 | 4.8 | 5.8 | 6.1 | 5.8 | 4.8 | 3 |
| K | 3 | 4 | 5 | 6 | 5 | 4 | 3 |

In a 16 antennas case, for N=16, the values of log 2(B) and K for A=1, . . . , 15 are shown in Table III. There is also a payload advantage to larger A as K increases from 4 for A=1 to a peak of 13 for A=7, 8, 9.

N=16 antennas. Values of log 2(B) and ancillary payload length K for A=1, . . . , 15.

TABLE III

| A | 1 | 2 | 3 | 4 | 5 | 6 | 7 | 8 |
|---|---|---|---|---|---|---|---|---|
| log2(B) | 4 | 6.9 | 9.1 | 10.8 | 12.1 | 12.9 | 13.5 | 13.7 |
| K | 4 | 6 | 9 | 10 | 12 | 12 | 13 | 13 |
| A | 9 | 10 | 11 | 12 | 13 | 14 | 15 | |
| log2(B) | 13.5 | 12.9 | 12.1 | 10.8 | 9.1 | 6.9 | 4 | |
| K | 13 | 12 | 12 | 10 | 9 | 6 | 4 | |

In some embodiments, the receiver can have multiple antennas, in contrast to the example embodiments of multiple input single output (MISO) with one data stream and one receive antenna, these additional embodiments can have $N_{rx}>1$ receive antennas. The transmitter side is unchanged in these embodiments. At the receiver, the non-coherent detection of dedicated pilot signals is modified to account from the multiple antennas. For receive antenna k, let $h_1^k, \ldots, h_N^k$ denote the N channel values to, and let $[r_1^k, \ldots, r_M^k]$ denote the received signal samples covering the dedicated pilot signal. For dedicated pilot signal candidate i and receive antenna k the receiver circuitry computes $\rho_i^k = r_1^k p_{i1}^* + \ldots + r_M^k p_{iM}^*$. The receiver circuitry accumulates the correlations over receive antennas $\sigma_i = \|\rho_i^1\| + \ldots + \|\rho_i^{N_{rx}}\|$ (summing up the squared magnitudes would be an alternative metric). The receiver circuitry can then form the vector $\rho = [\sigma_1, \ldots, \sigma_N]$. Then p is fed to the decoder, which is unchanged from the other example embodiments. Channel estimation is extended by using the channel estimate for transmit channel i and receive antenna k is given by $$\hat{h}_i^k = \frac{\rho_i^k}{\|p_i\|}.$$

The estimate of the composite channel (i.e., the combination of the main channel and ancillary channel) at receive antenna k is given by $\hat{h}^{kc} = \hat{h}_{j_1}^k + \ldots + \hat{h}_{j_A}^k$, after the active antennas are identified. The estimate is given by $\hat{h}^{kc} = h_1^k + \ldots + \hat{h}_N^k$ without knowledge of the active antenna identities. Once the channel estimation obtains $\hat{h}^c$, this value can be used to receive the rest of the burst coherently and output the regular payload. The channel estimates can be used in the coherent reception of the regular payload.

In further embodiments, the amount of information to be conveyed on the ancillary channel can be adapted according to the channel quality. The receiver can estimate the signal-to-interference-plus-noise ratio (SINR) of the channel. The estimated SINR can be an instantaneous SINR, reflecting the fading condition that the receiver is currently experiencing. Alternatively, the estimated SINR can be obtained by averaging the instantaneous SINR estimates over a sufficiently long period so that the effect of instantaneously fading is averaged out. The estimated SINR is fed back to the transmitter. Such information is referred to as channel quality indicator (CQI). The second alternative can be utilized in the case where either frequent CQI feedback is not desirable or simple link adaptation mechanism is sought after. The transmitter after receiving the CQI information can determine the number of active antennas (A) or determine the number of ancillary bits K for antenna selection. This can be based on comparing the CQI to a list of SINR thresholds.

Thus, the embodiments provide processes and systems to create an ancillary channel by signaling via the selection of a subset of active antennas, in addition to the regular transmission. The embodiments provide a receiver capable of extracting the ancillary information by computing correlations with dedicated pilot signals and further processing in a special decoder.

Figure 8:
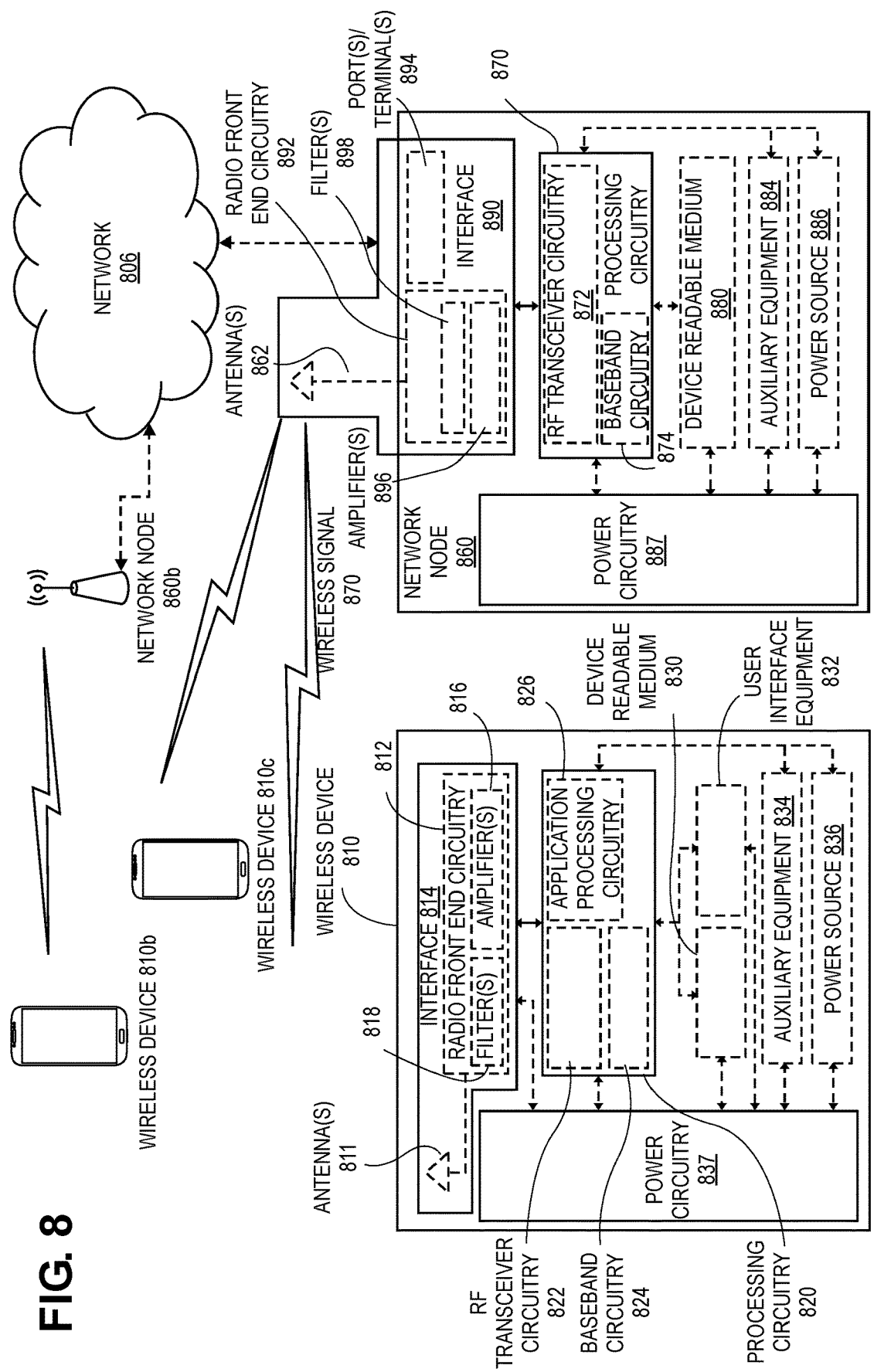
FIG. 8 is a diagram of one embodiment of a wireless network.

FIG. 8: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network, or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units.

In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node, and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node, and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
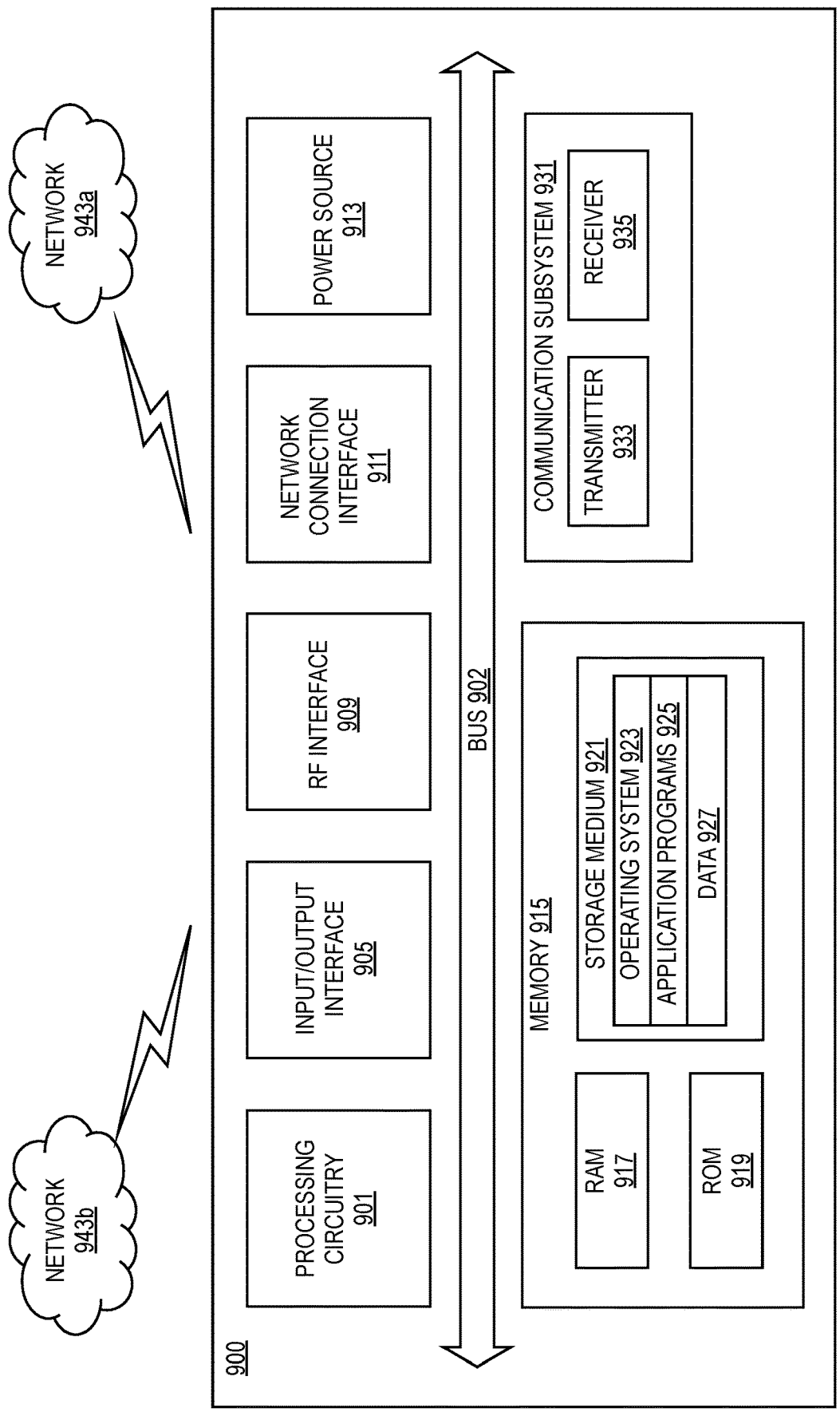
FIG. 9 is a diagram of one embodiment of User Equipment.

FIG. 9: User Equipment in Accordance with Some Embodiments

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 9200 may be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMAX, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
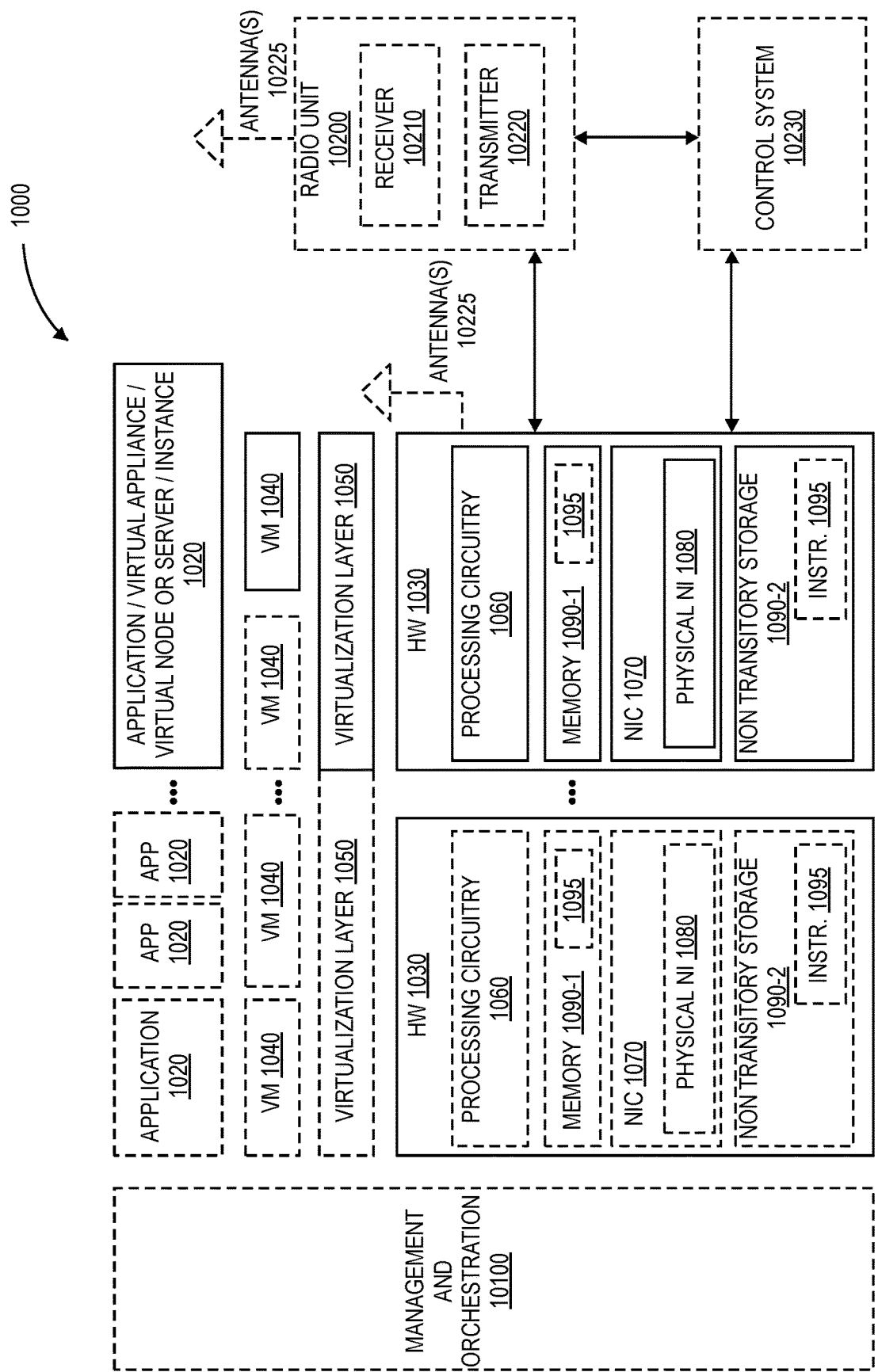
FIG. 10 is a diagram of one embodiment of a virtualization environment.

FIG. 10: Virtualization Environment in Accordance with Some Embodiments

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signalling can be effected with the use of control system 10230 which may alternatively be used for communication between the hardware nodes 1030 and radio units 10200.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of a base station to transmit information on an ancillary channel, the method comprising:
encoding a set of bits from input information as a codeword;
selecting a subset of active antennas that map to the codeword; and
transmitting, via the ancillary channel, at least one main channel payload on each antenna of the selected subset of active antennas with one of a plurality of different dedicated pilot signals associated with each respective one of the antennas of the selected subset of active antennas.

2. The method of claim 1, further comprising:
assigning each one of active antennas a different dedicated pilot signal.

3. The method of claim 1, further comprising:
determining a different codeword mapping to each one of a plurality of subsets of active antennas.

4. The method of claim 1, wherein the plurality of different dedicated pilots form an orthogonal set of sequences.

5. The method of claim 4, wherein the orthogonal set of sequences is any one of a set of Hadamard sequences, a set of Fourier sequences, a set of Zadoff-Chu sequences, or a set of cyclic-shifted Zadoff-Chu sequences.

6. A method of user equipment to receive information on an ancillary channel, the method comprising:
receiving a transmission of information on a main channel and the ancillary channel, where the ancillary channel information is encoded in a selection of a subset of active antennas at a transmitter;
determine the selection of the subset of active antennas from dedicated pilot signals of the transmission; and
extracting a set of information bits from the determined selection of the subset of active antennas.

7. The method of claim 6, wherein extracting the set of information bits further comprises:
determine a codeword mapped to the determined selection of the subset of active antennas; and
extracting the set of information bits from the codeword.

8. The method of claim 6, further comprising:
detecting the dedicated pilot signals of the transmission non-coherently.

9. The method of claim 6, further comprising:
performing channel estimation for the selected subset of active antennas.

10. The method of claim 6, further comprising:
outputting the main information of the main channel; and
outputting a codeword or the set of information bits as the ancillary channel information.

11. The method of claim 6, further comprising:
performing a coherent reception of the main channel utilizing channel estimates for the selected subset of active antennas.

12. A base station to transmit information on an ancillary channel, the base station comprising:
an encoder to map an input ancillary channel payload codeword to a subset of active antennas; and
antenna subset selection circuitry coupled to the encoder, the antennas subset selection circuitry to signal a radio front end the subset of active antennas to transmit a main payload with each active antenna of the subset of active antennas having a different unique pilot.

13. The base station of claim 12, further comprising:
ancillary channel circuitry to assign each one of a plurality of active antennas of the radio front end a separate unique pilot.

14. The base station of claim 12, further comprising:
ancillary channel circuitry to determine a different codeword mapping to each one of a plurality of subsets of active antennas.

15. The base station of claim 12, wherein a plurality of different unique pilots form an orthogonal set of sequences.

16. The base station of claim 15, wherein the orthogonal set of sequences is a set of Hadamard sequences or Fourier sequences.

17. A user equipment to receive information on an ancillary channel, the user equipment comprising:
a plurality of correlator circuits to receive a transmission of information on a main channel and the ancillary channel, where the ancillary channel information is encoded in a selection of a subset of active antennas at a transmitter, each of the plurality of correlator circuits to identify a unique pilot from the subset of active antennas; and
an ancillary channel decoder coupled to the plurality of correlator circuits, the ancillary channel decoder to determine a selection of the subset of active antennas from unique pilots of the transmission, and to extract a set of information bits from the determined selection of the subset of active antennas.

18. The user equipment of claim 17, wherein the plurality of correlator circuits detect unique pilots of the transmission non-coherently.

19. The user equipment of claim 17, further comprising:
a channel estimation circuitry coupled to the plurality of correlator circuits, the channel estimation circuitry to perform channel estimation for the transmission for the main channel.

20. The user equipment of claim 19, wherein the ancillary channel decoder outputs the set of bits as the ancillary channel information.

* * * * *

UNITED STATES PATENT AND TRADEMARK OFFICE
CERTIFICATE OF CORRECTION

Page 1 of 1

PATENT NO. : 11,038,648 B1
APPLICATION NO. : 16/923017
DATED : June 15, 2021
INVENTOR(S) : Khayrallah et al.

It is certified that error appears in the above-identified patent and that said Letters Patent is hereby corrected as shown below:

In the Specification

In Column 6, Line 19, delete "K=⌊ log 2(B)⌋," and insert -- $K = \lfloor \log 2(B) \rfloor$, --, therefor.

In Column 6, Lines 24-25, delete
"⌊ log 2(B²)⌋=[2 log 2(B)]≥2 ⌊ log 2(B)⌋ If ⌊2 log 2(B)⌋=2 ⌊ log 2(B)⌋+1," and insert
-- $\lfloor \log 2(B^2) \rfloor = [2 \log 2(B)] \geq 2 \lfloor \log 2(B) \rfloor$ If $\lfloor 2 \log 2(B) \rfloor = 2 \lfloor \log 2(B) \rfloor + 1$, --, therefor.

In Column 9, Line 41, delete "e=c₁|ρ₁|+ . . . +c_N|ρ_N." and insert -- $e = c_1|\rho_1| + \ldots + c_N|\rho_N|$. --, therefor.

In Column 10, Line 48, delete "log2(B)" and insert -- log 2(B) --, therefor.

In Column 10, Line 61, delete "log2(B)" and insert -- log 2(B) --, therefor.

In Column 11, Line 6, delete "log2(B)" and insert -- log 2(B) --, therefor.

In Column 11, Line 25, delete "$\sigma_i = \|\rho_i^1\| + \ldots + \|\rho_i^{Nrx}\|$" and insert -- $\sigma_i = |\rho_i^1| + \ldots + |\rho_i^{Nrx}|$ --, therefor.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*